US006953505B1

(12) United States Patent
Chatterji et al.

(10) Patent No.: US 6,953,505 B1
(45) Date of Patent: Oct. 11, 2005

(54) STABLE AND BIODEGRADABLE FOAMED CEMENT SLURRIES, ADDITIVES AND METHODS

(75) Inventors: Jiten Chatterji, Duncan, OK (US); D. Chad Brenneis, Marlow, OK (US); Bobby J. King, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/921,689

(22) Filed: Aug. 19, 2004

(51) Int. Cl.[7] .................. C04B 24/12; C04B 38/10
(52) U.S. Cl. ............. 106/677; 106/682; 106/728; 106/810; 106/823; 166/293; 405/266; 405/267
(58) Field of Search ............... 106/677, 682, 106/728, 810, 823; 166/293; 405/266, 267

(56) References Cited

U.S. PATENT DOCUMENTS

| | | | |
|---|---|---|---|
| 5,133,409 A | 7/1992 | Bour et al. | 166/293 |
| 5,147,565 A | 9/1992 | Bour et al. | 252/8.551 |
| 5,275,654 A * | 1/1994 | Cowan | 106/661 |
| 5,314,022 A * | 5/1994 | Cowan et al. | 166/293 |
| 5,322,124 A * | 6/1994 | Cowan et al. | 166/295 |
| 5,379,843 A * | 1/1995 | Unger et al. | 166/295 |
| 5,588,489 A | 12/1996 | Chatterji et al. | 166/293 |
| 5,696,059 A | 12/1997 | Onan et al. | 507/269 |
| 5,711,801 A | 1/1998 | Chatterji et al. | 106/789 |
| 5,897,699 A | 4/1999 | Chatterji et al. | 106/678 |
| 6,063,738 A | 5/2000 | Chatterji et al. | 507/269 |
| 6,202,751 B1 | 3/2001 | Chatterji et al. | 166/276 |
| 6,210,476 B1 | 4/2001 | Chatterji et al. | 106/677 |
| 6,220,354 B1 | 4/2001 | Chatterji et al. | 166/293 |
| 6,227,294 B1 | 5/2001 | Chatterji et al. | 166/293 |
| 6,244,343 B1 | 6/2001 | Brothers et al. | 166/293 |
| 6,273,191 B1 | 8/2001 | Reddy et al. | 166/293 |
| 6,332,921 B1 | 12/2001 | Brothers et al. | 106/692 |
| 6,336,505 B1 | 1/2002 | Reddy | 166/293 |
| 6,364,945 B1 | 4/2002 | Chatterji et al. | 106/677 |
| 6,367,550 B1 | 4/2002 | Chatterji et al. | 166/293 |
| 6,390,195 B1 | 5/2002 | Nguyen et al. | 166/276 |
| 6,454,004 B2 | 9/2002 | Reddy et al. | 166/293 |
| 6,454,008 B1 | 9/2002 | Chatterji et al. | 166/308 |
| 6,457,524 B1 | 10/2002 | Roddy | 166/293 |
| 6,478,868 B1 | 11/2002 | Reddy et al. | 106/696 |
| 6,500,252 B1 | 12/2002 | Chatterji et al. | 106/644 |
| 6,516,883 B1 | 2/2003 | Chatterji et al. | 166/293 |
| 6,547,871 B2 | 4/2003 | Chatterji et al. | 106/672 |
| 6,555,505 B1 | 4/2003 | King et al. | 507/202 |
| 6,592,660 B2 | 7/2003 | Nguyen et al. | 106/677 |
| 6,619,399 B1 | 9/2003 | Chatterji et al. | 166/293 |
| 6,630,021 B2 | 10/2003 | Reddy et al. | 106/809 |
| 6,662,873 B1 | 12/2003 | Nguyen et al. | 166/276 |
| 6,668,927 B1 | 12/2003 | Chatterji et al. | 166/291 |
| 6,689,208 B1 | 2/2004 | Brothers | 106/794 |
| 6,698,519 B2 | 3/2004 | Dusterhoft et al. | 166/294 |
| 6,715,553 B2 | 4/2004 | Reddy et al. | 166/309 |
| 6,722,433 B2 | 4/2004 | Brothers et al. | 166/288 |
| 6,722,434 B2 | 4/2004 | Reddy et al. | 166/292 |
| 6,734,146 B2 | 5/2004 | Chatterji et al. | 507/202 |
| 6,739,806 B1 | 5/2004 | Szymanski et al. | 405/267 |
| 6,767,867 B2 * | 7/2004 | Chatterji et al. | 507/216 |
| 6,793,730 B2 * | 9/2004 | Reddy et al. | 106/677 |
| 6,852,676 B1 * | 2/2005 | Chatterji et al. | 507/202 |
| 6,858,566 B1 * | 2/2005 | Reddy et al. | 507/202 |
| 2003/0000428 A1 | 1/2003 | Chatterji et al. | 106/821 |
| 2004/0016371 A1 | 1/2004 | Chatterji et al. | 106/716 |

OTHER PUBLICATIONS

Chemical Abstract No. 132:80058, abstract of an aticle by Muller et al entitled "Low Foaming Surfactants in Synergistic Ternary Blends", Proceedings of the World Conference on Detergents: Strategies of the 21st Century, 4th, Oct. 4-8, 1998 no month.*
"Capryl Compounds", Hawley's Condensed Chemical Dictionary, 14th Edition, Wiley & Sons (2002) no month.*
Halliburton brochure entitled "AQF-2 Foaming Agent" dated 1999, no month.
Halliburton brochure entitled "Howco-Suds Surfactant" dated 1999, no month.

* cited by examiner

Primary Examiner—Anthony J. Green
(74) Attorney, Agent, or Firm—Craig W. Roddy; Baker Botts L.L.P.

(57) ABSTRACT

The present invention relates to stable and biodegradable foamed cement slurries, additives and methods. A foamed cement slurry of the invention comprises a hydraulic cement, sufficient water to form a slurry, sufficient gas to form a foam and a biodegradable foaming and stabilizing additive comprising a mixture of a capryl/capramido propyl betaine surfactant and a capryl/capramido propyl dimethyl amine oxide surfactant.

34 Claims, No Drawings

STABLE AND BIODEGRADABLE FOAMED CEMENT SLURRIES, ADDITIVES AND METHODS

BACKGROUND OF THE INVENTION

1. Field of the Invention

The present invention relates to foamed cement slurries and additives as well as methods of cementing utilizing the foamed cement slurries and additives.

2. Description of the Prior Art

Foamed hydraulic cement slurries are commonly utilized in forming structures above and below ground. In forming the structures, the foamed hydraulic cement composition is placed into a form or other location to be cemented and allowed to set therein. Heretofore, foamed cement slurries have included foaming and stabilizing additives which are not biodegradable and which do not stabilize foamed cement compositions at high temperatures. Thus, there is a need for foamed hydraulic cement slurries which include biodegradable foaming and stabilizing additives that remain stable at high temperatures.

In the construction and repair of wells such as oil and gas wells, foamed hydraulic cement slurries are often pumped into locations in the wells to be cemented and allowed to set therein. In primary cementing, foamed cement slurries are often utilized. That is, the foamed cement slurries are pumped into the annular spaces between the walls of the well bores and the exterior surfaces of pipe strings disposed therein. The foamed cement slurries are compressible which prevents the inflow of undesirable fluids into the annular spaces and the foamed cement slurries set therein whereby annular sheaths of hardened cement are formed therein. The annular cement sheaths physically support and position the pipe strings in the well bores and bond the exterior surfaces of the pipe strings to the walls of the well bores whereby the undesirable migration of fluids between zones or formations penetrated by the well bores is prevented.

SUMMARY OF THE INVENTION

The present invention provides highly stable biodegradable foamed cement slurries, additives and methods of cementing which meet the needs described above and overcome the deficiencies of the prior art.

A stable foamed cement slurry of the present invention comprises a hydraulic cement, sufficient water to form a slurry, sufficient gas to form a foam and a biodegradable foaming and stabilizing additive comprising a mixture of a capryl/capramido propyl betaine surfactant and a capryl/capramido propyl dimethyl amine oxide surfactant.

A biodegradable additive for foaming and stabilizing a cement slurry of this invention comprises a mixture of a capryl/capramido propyl betaine surfactant and a capryl/capramido propyl dimethyl amine oxide surfactant.

A method of cementing of this invention comprises the steps of preparing or providing a foamed cement slurry comprising a hydraulic cement, sufficient water to form a slurry, sufficient gas to form a foam and a biodegradable foaming and stabilizing additive comprising a mixture of a capryl/capramido propyl betaine surfactant and a capryl/capramido propyl dimethyl amine oxide surfactant. The foamed cement slurry is placed in a location to be cemented and allowed to set therein.

A method of cementing a subterranean zone penetrated by a well bore of this invention comprises providing or preparing a foamed cement slurry comprising a hydraulic cement, sufficient water to form a slurry, sufficient gas to form a foam and a biodegradable foaming and stabilizing additive comprising a mixture of a capryl/capramido propyl betaine surfactant and a capryl/capramido propyl dimethyl amine oxide surfactant. The foamed cement slurry is placed in the subterranean zone to be cemented by way of the well bore and then allowed to set into a hard impermeable mass.

The objects, features and advantages of the present invention will be readily apparent to those skilled in the art upon a reading of the description of preferred embodiments which follows.

DESCRIPTION OF PREFERRED EMBODIMENTS

The present invention provides stable and biodegradable foamed cement slurries, biodegradable additives for foaming and stabilizing cement slurries, methods of cementing using biodegradable foamed cement slurries and placing the foamed cement slurries in locations to be cemented and methods of cementing with biodegradable foamed cement slurries and placing the foamed cement slurries in subterranean zones penetrated by well bores.

A stable and biodegradable foamed cement slurry of this invention comprises a hydraulic cement, sufficient water to form a slurry, sufficient gas to form a foam, and a biodegradable foaming and stabilizing additive. The additive comprises a mixture of a capryl/capramido propyl betaine surfactant and a capryl/capramido propyl dimethyl amine oxide surfactant.

A variety of hydraulic cements can be utilized in accordance with the present invention including, but not limited to, Portland cements, slag cements, silica cements, pozzolana cements and aluminous cements. Of these, Portland cements are generally preferred. Portland cements of the types defined and described in API Specification for Materials and Testing for Well Cements, API Specification 10B, $22^{nd}$ Edition, dated Dec. 1, 1997 of the American Petroleum Institute are particularly suitable. Preferred API Portland cements include Classes A, B, C, G, and H with API Classes G and H being more preferred and Class H being the most preferred.

The water in the foamed cement slurry can be fresh water, unsaturated salt solution or saturated salt solutions. Generally, the water in the foamed cement slurry is present in an amount in the range of from about 35% to about 100% by weight of the hydraulic cement therein.

The gas utilized to foam the cement slurry can be air or nitrogen with nitrogen being preferred. Generally, the gas is present in the foamed cement slurry in an amount in the range of from about 10% to about 80% by volume of the slurry.

The biodegradable foaming and stabilizing additive is a mixture of 95% by weight capryl/capramido propyl betaine surfactant and 5% by weight capryl/capramido propyl dimethyl amine oxide surfactant. The biodegradable foaming and stabilizing additive is generally present in an amount in the range of from about 0.8% to about 10% by volume of the water therein.

The biodegradable foaming and stabilizing additive of this invention facilitates the foaming of the cement slurry and stabilizes the foamed cement slurry, i.e., prevents the foam from dissipating, at temperatures in the range of from about 50° F. to about 400° F.

A preferred stable foamed cement slurry of this invention comprises: a hydraulic cement; sufficient water to form a slurry; sufficient gas to form a foam; and a biodegradable foaming and stabilizing additive comprising a mixture of a capryl/capramido propyl betaine surfactant and a capryl/capramido propyl dimethyl amine oxide surfactant.

A preferred biodegradable additive of this invention for foaming and stabilizing a cement slurry comprises a mixture of a capryl/capramido propyl betaine surfactant and a capryl/capramido propyl dimethyl amine oxide surfactant.

A preferred method of this invention comprises the steps of: preparing or providing a foamed cement slurry comprising a hydraulic cement, sufficient water to form a slurry, sufficient gas to form a foam and a biodegradable foaming and stabilizing additive comprising a mixture of capryl/capramido propyl betaine surfactant and a capryl/capramido propyl dimethyl amine oxide surfactant; placing the foamed cement slurry in a location to be cemented; and allowing the cement slurry to set.

Another preferred method of cementing a subterranean zone penetrated by a well bore comprises the steps of: preparing or providing a foamed cement slurry comprising a hydraulic cement, sufficient water to form a slurry, sufficient gas to form a foam and a biodegradable foaming and stabilizing additive comprising a mixture of a capryl/capramido propyl betaine surfactant and a capryl/capramido propyl dimethyl amine oxide surfactant; placing the foamed cement slurry in the subterranean zone by way of the well bore; and allowing the foamed cement slurry to set into a hard impermeable mass.

In order to further illustrate the stable foamed cement slurries of this invention and the biodegradable additive for foaming and stabilizing the cement slurries, the following examples are given.

EXAMPLE 1

The biodegradable foaming and stabilizing additive comprising a mixture of 95% by weight capryl/capramido propyl betaine surfactant and 5% by weight capryl/capramido propyl dimethyl amine oxide surfactant was evaluated in cement slurries comprising Class H cement in 40% by weight fresh water, salt water containing 37% sodium chloride and seawater. The cement slurries containing the biodegradable foaming and stabilizing additive were foamed to lower densities and cured at 140° F. for 72 hours. The resulting cured foamed cements were tested for compressive strength and for densities after setting at the top, middle and bottom sections of the set foamed cements. These tests are set forth in Table I below.

TABLE I

| | Class H Cement in Various Waters (16.49 lb/gal Density) | | | | | | |
|---|---|---|---|---|---|---|---|
| Water | Biodegradable[1] Foaming and Stabilizing Additive % by vol. of water | Foamed Density, (lb/gal) | Time To Reach Density, Seconds | 72 Hour Compressive Strength, psi | Density After Set (lb/gal) | | |
| | | | | | Top | Middle | Bottom |
| Fresh Water | 2 | 10.88 | 5 | 961 | 10.54 | 10.34 | 10.38 |
| Saturated Salt Water (37% NaCl) | 2 | 10.78 | 6 | 698 | 10.63 | 10.39 | 10.51 |
| Seawater | 2 | 10.33 | 5 | 1081 | 10.11 | 10.05 | 10.15 |

[1]Mixture of 95% by weight capryl/capramido propyl betaine surfactant and 5% by weight capryl/capramido propyl dimethyl amine oxide surfactant.

From Table I, it can be seen that the cement slurries containing fresh water, saturated salt water and seawater had good compressive strengths and top, middle and bottom densities showing good stability.

EXAMPLE 2

Various cement slurries mixed with fresh water and the biodegradable foaming and stabilizing additive of this invention having various densities were foamed, cured at 140° F. for 72 hours and tested for compressive strength and top, middle and bottom densities after set. The results of these tests are set forth in Table II below.

TABLE II

Fresh Water and Various Cements Having Various Densities

| Water | Cement And Density (lb/gal) | Biodegradable[1] Foaming and Stabilizing Additive % by vol. of water | Foamed Density, (lb/gal) | Time To Reach Density, Seconds | 72 Hour Compressive Strength, psi | Density After Set (lb/gal) | | |
|---|---|---|---|---|---|---|---|---|
| | | | | | | Top | Middle | Bottom |
| Fresh | MicroMatrix- 12.5 | 2 | 9.76 | 5 | 801 | 9.94 | 9.85 | 9.98 |
| Fresh | Calcium Aluminate And ASTM Class F Fly Ash - 15.02 | 2 | 10.99 | 10 | 331 | 11.22 | 11.32 | 11.46 |
| Fresh | Slag Cement And 8% Sodium Carbonate - 14.99 | 2 | 11.31 | 20 | 1051 | 11.08 | 11.05 | 11.05 |
| Fresh | ASTM Class F Fly Ash, 15% Hydrated Lime and 4% Calcium Chloride - 14.79 | 2 | 10.03 | 10 | 651 | 9.93 | 9.88 | 9.94 |

[1]Mixture of 95% by weight capryl/capramido propyl betaine surfactant and 5% by weight capryl/capramido propyl dimethyl amine oxide surfactant.

Table II shows that the biodegradable foaming and stabilizing additive of this invention functions well in MicroMatrix cement slurries, calcium aluminous cement slurries, slag cement slurries and Class F fly ash and hydrated lime cement slurries.

EXAMPLE 3

Foamed cement slurries are extensively used in off-shore operations. In order to evaluate the extent of retardation properties of the biodegradable foaming and stabilizing additive of this invention, a cement slurry comprising fresh water and Class H cement having a density of 16.49 lb/gal was foamed to a density of 10.77 lb/gal. The foamed cement was conditioned for 1 hour at 50° F. and then cured for 72 hours at 55° F. The 72 hour compressive strength was only 88.5 and the top, middle and bottom densities after set were 10.20/11.54/12.34 indicating that the foamed slurry was not stable.

EXAMPLE 4

A cement slurry comprising fresh water, Class H cement and amorphous silica in an amount of 5% by weight of the cement was prepared having a 16.33 lb/gal density. The slurry was foamed to 10.7 lb/gal at 80° F., conditioned at 50° F. for 1 hour and cured for 72 hours at 55° F. The cured sample was stable and had an average weight of 11.36 lb/gal.

EXAMPLE 5

A cement slurry was prepared comprising fresh water, Class H cement, crystalline silica present in an amount of 35% by weight of the cement, amorphous silica present in an amount of 15% by weight of the cement and a cement retarder present in an amount of 0.6% by weight of cement. The slurry had a density of 16.29 lb/gal and it was foamed to a density of 11.5 lb/gal. The slurry was heated to 200° F. at 1000 psi using a Mini-MACS Analyzer to generate foam under field conditions. The Mini-MACS Analyzer was modified to prepare the foam cement under pressure. The modifications consisted of a special tapered slurry cup with a special seal system, high speed rotation of the paddle inside the slurry cup and a nitrogen pressure source. The unfoamed slurry was placed into the special slurry cup and sealed. The slurry weight is the amount that will provide the desired slurry density for the volume of the cup. The slurry cup was placed into the modified Mini-MACS Analyzer and stirred at 1000 rpm and 10 minutes with 1000 psi nitrogen pressure applied. The speed was then reduced to 150 rpm (standard API stirred speed) and the temperature increased to a bottom hole circulating temperature of 200° F. Upon reaching BHCT (time for the cement slurry to reach the bottom hole conditions), the stirring was stopped and the temperature was increased to 250° F., the bottom hole static temperature at the end of 4 hours from the start of the test. After curing for 72 hours, the Mini-MACS Analyzer was cooled to room temperature to allow inspection of the set foamed slurry. The nitrogen pressure was released very slowly, normally over a 2 to 4 hour period of time. After the Mini-MACS Analyzer was cooled and pressure was released, the slurry cup was removed, opened, and the slurry was pressed from the slurry cup. The set foamed slurry was then used to determine the slurry density. This was done by taking sections from top, middle and bottom of the set slurry and measuring the densities. The densities of the set foamed cement at the top, middle and bottom were 9.94 lb/gal, 10.65 lb/gal and 11 lb/gal showing that the cement slurry was stable.

Thus, the present invention is well adapted to carry out the objects and attain the ends and advantages mentioned as well as those inherent therein. While numerous changes may be made by those skilled in the art, such changes are encompassed within the spirit of this invention as defined by the appended claims.

What is claimed is:

1. A foamed cement slurry comprising:
   a hydraulic cement;
   water;
   a gas; and
   a foaming and stabilizing additive comprising a mixture of a capryl/capramido propyl betaine surfactant and a capryl/capramido propyl dimethyl amine oxide surfactant.

2. The foamed cement slurry of claim 1 wherein the hydraulic cement comprises at least one of the following: Portland cement, slag cement, silica cement, pozzolana cement or aluminous cement.

3. The foamed cement slurry of claim 1 wherein the water comprises at least one of the following: fresh water, an unsaturated salt solution or a saturated salt solutions.

4. The foamed cement slurry of claim 1 wherein the water is present in an amount in the range of from about 35% to about 100% by weight of hydraulic cement therein.

5. The foamed cement slurry of claim 1 wherein the gas comprises at least one of the following: air or nitrogen.

6. The foamed cement slurry of claim 1 wherein the gas is present in an amount in the range of from about 10% to about 80% by volume of the cement slurry.

7. The foamed cement slurry of claim 1 wherein the foaming and stabilizing additive is a mixture of 95% by weight capryl/capramido propyl betaine surfactant and 5% by weight capryl/capramido propyl dimethyl amine oxide surfactant.

8. The foamed cement slurry of claim 1 wherein the foaming and stabilizing additive is present in an amount in the range of from about 0.8% to about 10% by volume of the water therein.

9. The foamed cement slurry of claim 1 wherein the foaming and stabilizing additive stabilizes the slurry at temperatures in the range of from about 50° F. to about 400° F.

10. The foamed cement slurry of claim 1 wherein the foaming and stabilizing additive is biodegradable.

11. An additive for foaming and stabilizing a cement slurry comprising a mixture of a capryl/capramido propyl betaine surfactant and a capryl/capramido propyl dimethyl amine oxide surfactant.

12. The additive of claim 11 wherein the capryl/capramido propyl betaine surfactant is present in the mixture in an amount of about 95% by weight and the capryl/capramido propyl dimethyl amine oxide surfactant is present in an amount of about 5% by weight.

13. The additive of claim 11 wherein the mixture of the capryl/capramido propyl betaine surfactant and the capryl/capramido propyl dimethyl amine oxide surfactant stabilizes a foamed cement slurry at temperatures in the range of from about 50° F. to about 400° F.

14. The additive of claim 11 wherein the additive is biodegradable.

15. A method of cementing comprising the steps of:
   providing a foamed cement slurry comprising a hydraulic cement, water, a gas and a foaming and stabilizing additive comprising a mixture of a capryl/capramido propyl betaine surfactant and a capryl/capramido propyl dimethyl amine oxide surfactant;
   placing the foamed cement slurry in a location to be cemented; and
   allowing the cement slurry to set.

16. The method of claim 15 wherein the hydraulic cement in the slurry comprises at least one of the following: Portland cement, slag cement, silica cement, pozzolana cement or aluminous cement.

17. The method of claim 15 wherein the water in the slurry comprises at least one of the following: fresh water, an unsaturated salt solutions or a saturated salt solutions.

18. The method of claim 15 wherein the water in the slurry is present in an amount in the range of from about 35% to about 100% by weight of hydraulic cement therein.

19. The method of claim 15 wherein the gas in the slurry comprises at least one of the following: air or nitrogen.

20. The method of claim 15 wherein the gas in the slurry is present in an amount in the range of from about 10% to about 80% by volume of the cement slurry.

21. The method of claim 15 wherein the foaming and stabilizing additive in the slurry is a mixture of 95% by weight capryl/capramido propyl betaine surfactant and 5% by weight capryl/capramido propyl dimethyl amine oxide surfactant.

22. The method of claim 15 wherein the foaming and stabilizing additive in the slurry is present in an amount in the range of from about 0.8% to about 10% by volume of the water therein.

23. The method of claim 15 wherein the foaming and stabilizing additive stabilizes the slurry at temperatures in the range of from about 50° F. to about 400° F.

24. The method of claim 15 wherein the foaming and stabilizing additive is biodegradable.

25. The method of claim 15 wherein the foamed cement slurry is placed in a subterranean formation.

26. A method of cementing a subterranean zone penetrated by a well bore comprising the steps of:
   providing a foamed cement slurry comprising a hydraulic cement, water, a gas and a biodegradable foaming and stabilizing additive comprising a mixture of a capryl/capramido propyl betaine surfactant and a capryl/capramido propyl dimethyl amine oxide surfactant;
   placing the foamed cement slurry in the subterranean zone by way of the well bore; and
   allowing the foamed cement slurry to set.

27. The method of claim 26 wherein the hydraulic cement in the slurry comprises at least one of the following: Portland cement, slag cement, silica cement, pozzolana cement or aluminous cement.

28. The method of claim 26 wherein the water in the slurry comprises at least one of the following: fresh water, an unsaturated salt solutions or a saturated salt solutions.

29. The method of claim 26 wherein the water in the slurry is present in an amount in the range of from about 35% to about 100% by weight of hydraulic cement therein.

30. The method of claim 26 wherein the gas in the slurry comprises at least one of the following: air or nitrogen.

31. The method of claim 26 wherein the gas in the slurry is present in an amount in the range of from about 10% to about 80% by volume of the cement slurry.

32. The method of claim 26 wherein the biodegradable foaming and stabilizing additive in the slurry is a mixture of 95% by weight capryl/capramido propyl betaine surfactant and 5% by weight capryl/capramido propyl dimethyl amine oxide surfactant.

33. The method of claim 26 wherein the biodegradable foaming and stabilizing additive in the slurry is present in an amount in the range of from about 0.8% to about 10% by volume of the water therein.

34. The method of claim 26 wherein the biodegradable foaming and stabilizing additive stabilizes the slurry at temperatures in the range of from about 50° F. to about 400° F.

* * * * *